(12) United States Patent
Marantz et al.

(10) Patent No.: US 9,449,302 B1
(45) Date of Patent: Sep. 20, 2016

(54) GENERATING PERSONALIZED WEBSITES AND NEWSLETTERS

(75) Inventors: Joshua Marantz, Brookline, MA (US); Mussie Shore, Carlisle, MA (US); Jonathan Terleski, Mountain View, CA (US); Geoffrey Borggaard, Lincoln, MA (US); Sami Shalabi, Winchester, MA (US); Christopher Richard Wren, Arlington, MA (US)

(73) Assignee: GOOGLE INC., Mountain View, CA (US)

( * ) Notice: Subject to any disclaimer, the term of this patent is extended or adjusted under 35 U.S.C. 154(b) by 1124 days.

(21) Appl. No.: 13/289,992

(22) Filed: Nov. 4, 2011

Related U.S. Application Data

(60) Provisional application No. 61/410,313, filed on Nov. 4, 2010.

(51) Int. Cl.
*G06Q 10/10* (2012.01)
*G06F 3/048* (2013.01)

(52) U.S. Cl.
CPC ............ *G06Q 10/10* (2013.01); *G06F 3/048* (2013.01); *G06Q 10/109* (2013.01)

(58) Field of Classification Search
CPC ..... G06Q 10/10; G06Q 10/109; G06F 3/048
USPC ........................................................ 715/751
See application file for complete search history.

(56) References Cited

U.S. PATENT DOCUMENTS

| | | | |
|---|---|---|---|
| 5,784,615 A * | 7/1998 | Lipe et al. | ..................... 719/324 |
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,849,411 B1 * | 12/2010 | George et al. | ................ 715/758 |
| 2001/0047292 A1 * | 11/2001 | Montoya | ........................ 705/10 |

(Continued)

FOREIGN PATENT DOCUMENTS

WO      WO0279984      10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Angie Badawi
(74) *Attorney, Agent, or Firm* — Patent Law Works LLP

(57) ABSTRACT

A system and method for generating a membership profile for a personalized website is disclosed. An online services provider uses the interest engine to generate a questionnaire and polls. A new user provides responses that include answers to the questionnaire and polls. A profile engine generates a membership profile based on the answers. A newsletter engine generates personalized newsletter information including a number of users that provided each answer. In response to an online services provider selecting the recipients for the newsletter, the newsletter engine either generates the newsletter and transmits it to the recipients or the newsletter engine transmits the contact information to the online services provider.

17 Claims, 13 Drawing Sheets

(56) References Cited

U.S. PATENT DOCUMENTS

| | | |
|---|---|---|
| 2002/0137490 A1 | 9/2002 | Gallant |
| 2002/0143874 A1 | 10/2002 | Marquette et al. |
| 2004/0258220 A1 | 12/2004 | Levine et al. |
| 2005/0152521 A1 | 7/2005 | Liljestrand |
| 2006/0026288 A1 | 2/2006 | Acharya et al. |
| 2006/0077957 A1 | 4/2006 | Reddy et al. |
| 2006/0206604 A1 | 9/2006 | O'Neil et al. |
| 2006/0282304 A1* | 12/2006 | Bedard et al. .................. 705/10 |
| 2007/0127631 A1 | 6/2007 | Difiglia |
| 2007/0171898 A1 | 7/2007 | Salva |
| 2007/0173236 A1 | 7/2007 | Vishwanathan et al. |
| 2007/0248077 A1 | 10/2007 | Mahle, Jr. et al. |
| 2008/0056475 A1 | 3/2008 | Brannick et al. |
| 2008/0103877 A1* | 5/2008 | Gerken ........................... 705/10 |
| 2008/0134042 A1* | 6/2008 | Jankovich .................... 715/733 |
| 2008/0192656 A1 | 8/2008 | Vagelos |
| 2010/0281399 A1* | 11/2010 | Banker ........................ 715/758 |
| 2011/0098156 A1 | 4/2011 | Ng et al. |
| 2011/0252103 A1* | 10/2011 | Beyer et al. .................. 709/206 |
| 2012/0271884 A1* | 10/2012 | Holmes et al. ............... 709/204 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support"Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, pp. 252-255, London, United Kingdom.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, May 13, 2011, 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Murchu et al., "Online Social and Business Networking Communities," Digital Enterprise Research Institute DERI Technical Report, National University of Ireland, Aug. 8, 2004, 22 pgs.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

Figure 7

GENERATING PERSONALIZED WEBSITES AND NEWSLETTERS

CROSS REFERENCE TO RELATED APPLICATIONS

This application claims priority under 35 USC §119(e) to U.S. Provisional Patent Application No. 61/410,313, entitled "Membership Profiles for Personalized Websites," filed Nov. 4, 2010, which is hereby incorporated by reference for all purposes.

BACKGROUND

The specification relates to generating a personalized newsletter. In particular, the specification relates to generating questions and polls and using answers to the questions and polls to generate a membership profile and personalized newsletters.

As technology improves, the ability to disseminate information has increased drastically. This surplus of information allows people to have interests in more specialized areas. For example, a few years ago people were generally interested in photography. Now, people can specialize in digital cameras, digital single lens reflex (dSLR) cameras or even Nikon d300s dSLRs with Sigma lenses. Similarly, people are no longer simply Democrats, Republicans or Independents. They are Blue-Dog Democrats, Log-Cabin Republicans, Green-Party Members, Tea Partiers, Libertarians, Neocons, etc.

The specialized nature of information makes it more difficult to find the appropriate website for discussing a hobby with other people. Viewing a website on digital photography can be a waste of time if everyone wants to discuss using old Polaroid instant cameras or Canon point-and-shoots. Similarly, viewing a website for Republicans can result in a poor experience if the Neocons and the Tea Partiers get into a conversation with a Goldwater Republican.

This is particularly problematic from a website developer's perspective because if the website developer caters to a narrow subset of the population, then it results in a decreased stream of traffic. But if the website developer tries to appeal to everyone broadly, the website developer fails to make anyone happy. As a result, what is needed is a method for personalizing a website.

In addition to the problem of finding the proper website, people frequently visit these websites in order to have satisfying interactions with other people that are interested in the same hobby. It can be difficult to identify whether a user in the online community shares your interests because user profiles are typically devoid of specific information. User profiles are created to represent a user to the whole world. As a result, the user may not want to include her love of Nikon d300 dSLRs on a user profile because it is not a defining characteristic. In addition the user may not want to include his political affiliation for fear of alienating potential employers and friends. Furthermore, even if the user is willing to disclose highly specific information on his user profile, the profile will contain information that is unrelated to the purpose of a particular website. Thus, what is also needed is a way of personalizing a user profile according to the particular online community that the user is visiting.

Lastly, websites frequently send out newsletters to keep their members engaged in the website. When the newsletters are of a general nature, however, they provide little benefit because members are not interested in wading through the material to find information on their specialized interests. As a result, what is needed is a way to provide personalized newsletters.

SUMMARY

The specification overcomes the deficiencies and limitations of the prior art at least in part by providing a system and method for generating a membership profile for an online community. An online services provider uses the interests engine to generate questions and polls for the users. The interests engine provides the user with the ability to specify the format of the question (yes/no, multiple choice, free form) and whether the user is presented with a bundled set of questions or smaller sections of questions. In one embodiment, an application programming interface (API) module retrieves questions from similar websites and the interests engine provides the questions to the online services provider as suggestions.

For new users, a profile engine imports a generic profile. The questions and polls are presented to a user. The user answers questions that are received by the profile engine and combined with the generic profile information to generate a membership profile. The questions, polls and answers are saved with their unique identification to a data store. A profile engine retrieves the responses and uses them to generate the membership profile. A personalizing engine retrieves the responses and uses them to customize different types of particular content presented on the website as gadgets. The advertising engine retrieves the responses and uses them to generate personalized advertisements.

A newsletter engine generates newsletters for members of the website. The newsletters are personalized according to members' answers to questions and polls. In one embodiment the newsletter engine retrieves members' comments and analyzes them to generate additional interests for dividing the newsletter audience. When an online services provider is determining which topics to include in a particular newsletter, the newsletter engine displays a list of all recipients in each category. This provides the online services provider with a feel for the audience without compromising the members' privacy by including their email addresses.

In one embodiment, the newsletter is generated by displaying a plurality of questions for a plurality of users to answer, receiving a request for generating a newsletter, retrieving the plurality of questions, answers and a number of people that selected each answer, receiving a selection of a plurality of subscribers based on the answers and transmitting the newsletter to the selected subscribers.

BRIEF DESCRIPTION OF THE DRAWINGS

The specification is illustrated by way of example, and not by way of limitation in the figures of the accompanying drawings in which like reference numerals are used to refer to similar elements.

FIG. 7 is a graphic representation of one embodiment of a member's view of the website.

DETAILED DESCRIPTION

Overview

A system and method for generating a newsletter is described below. In one embodiment, the profile engine generates questions and polls that are displayed on a website. Users answer the questions and polls and the profile engine generates a membership profile for each user.

A newsletter engine generates newsletters for members of the website. The term newsletter as used herein encompasses its plain and ordinary meaning including, but not limited to, a publication about the subject matter of the website. In one embodiment the newsletter also includes a summary of recent activity of members of the website.

The newsletters are personalized according to members' answers to questions and polls. The user interface engine generates a user interface for the online services provider that includes the plurality of questions, answers and a number of people that selected each answer. The user interface engine transmits the user interface to the online services provider. The newsletter engine receives a selection of at least a subset of the plurality of users that are designated to receive the newsletter based at least in part on the answers and transmits the newsletter to the selection of at least the subset of users.

System Overview

Figure 1:
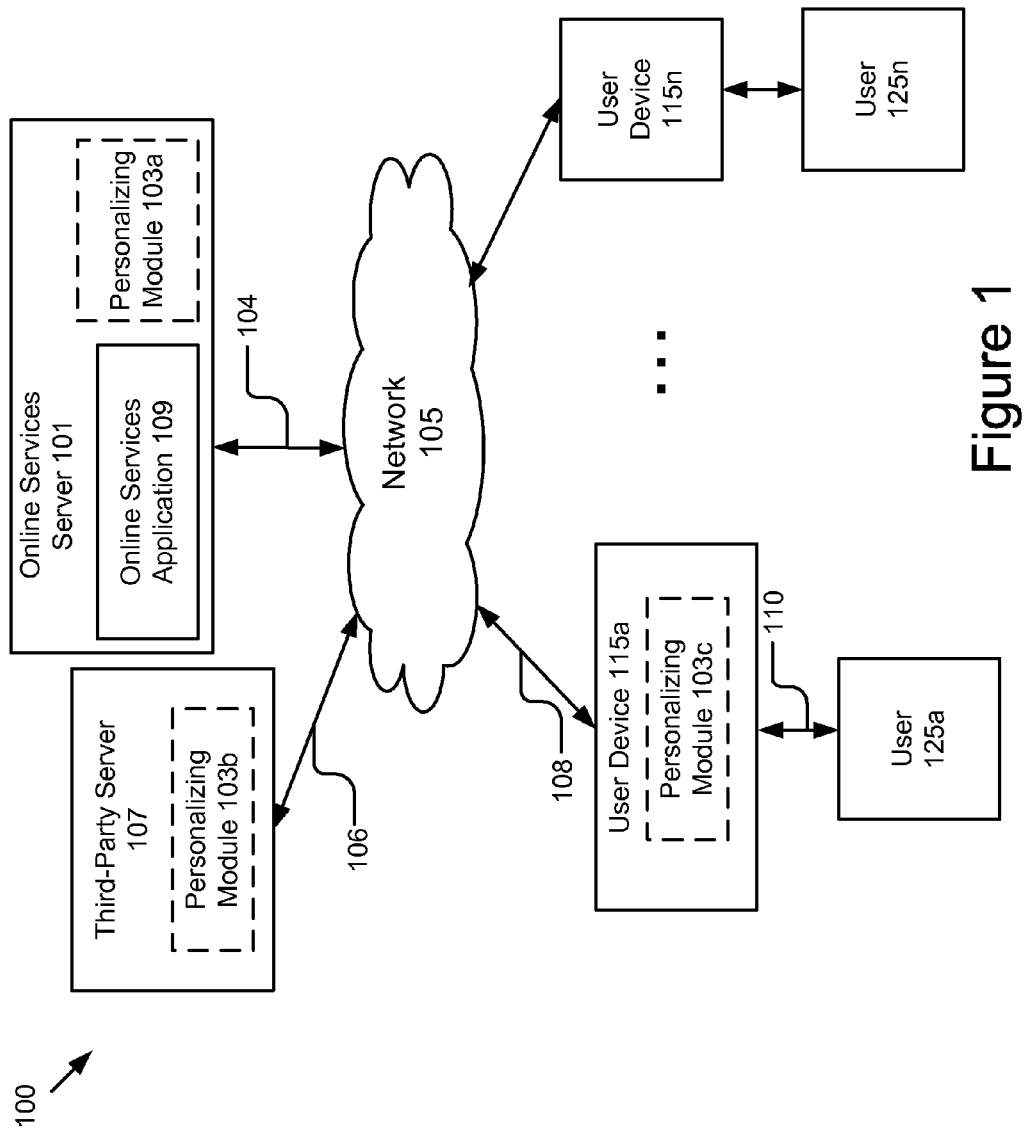
FIG. 1 is a high-level block diagram illustrating one embodiment of a system for generating a personalized online community.

FIG. 1 illustrates a block diagram of a system 100 for generating a newsletter for an online community according to one embodiment. The system 100 includes user devices 115a, 115b, 115n that are accessed by users 125a, 125b, 125n, an online services server 101 and a third-party server 107. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities are communicatively coupled via a network 105. While only one network 105 is coupled to the user devices 115a, 115b, the online services server 101 and the third-party server 107, in practice any number of networks 105 can be connected to the entities.

The personalizing module 103 generates questions and polls that are presented to new users on a website. The new users answer the questions. The personalizing module 103 generates a membership profile from the answers. The phrase membership profile as used herein encompasses its plain and ordinary meaning including, but not limited to, an aggregation of answers submitted by a user in response to the user viewing at least one question generated by the personalizing module. The personalizing module 103 uses the answers to generate personalized content. The personalizing module 103 generates content, such as gadgets that include the personalized content, such as a display of advertisements or forum discussions that match keywords from the member's profile. The personalizing module 103 also generates newsletters that are personalized according to a member profile.

In one embodiment, the personalizing module 103a is operable on the online services server 101, which also includes an online services application 109 that provides online services including the generation and maintenance of a website and a newsletter generation service. The personalizing module 103a is a separate application that generates, for example, a gadget with self contained software that is incorporates as part of the website generated by the online services application 109 and includes an online community. The online services server 101 is coupled to the network 105 via signal line 104. While only one online services server 101 is illustrated, multiple website servers 101 are possible.

In another embodiment, the personalizing module 103b is operable on a third-party server 107, such as a Google® server. The personalizing module 103b communicates with the online services application 109 via the network 105. In another embodiment, the personalizing module 103b that is operable on the third-party server 107 also includes software for generating the web content instead of having a separate application as illustrated in the online services server 101 example. The third-party server 107 is coupled to the network 105 via signal line 106. While only one third-party server 107 is illustrated, multiple third-party servers 107 are possible.

In yet another embodiment, the personalizing module 103c is stored on a user device 115a. The user devices 115a, 115n in FIG. 1 are used by way of example. Although only two devices are illustrated, persons of ordinary skill in the art will recognize that any number of user devices 115n are available to any number of users 125n. The user device 115 is any computing device that includes a memory and a processor, such as a personal computer, a laptop, a smartphone, a cellular phone, a personal digital assistant (PDA), a tablet computer, a portable game player, a portable music player, a television with one or more processors embedded therein or coupled thereto or any other electronic device capable of accessing a network. The user device 115a accesses the network 105 via signal line 108. The user 125a interacts with the client device 115a as represented by signal line 110. Client device 115n and user 125n are coupled and interact in a similar manner.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The user device 115 is any computing device that includes a memory and a processor, such as a personal computer, a laptop, a smartphone, a cellular phone, a personal digital assistant (PDA), etc. The user device 115a accesses the network 105 via signal line 108. The user 125a interacts with the client device 115a as represented by signal line 110. Client device 115n and user 125n are coupled and interact in a similar manner.

Personalizing Module

Figure 2:
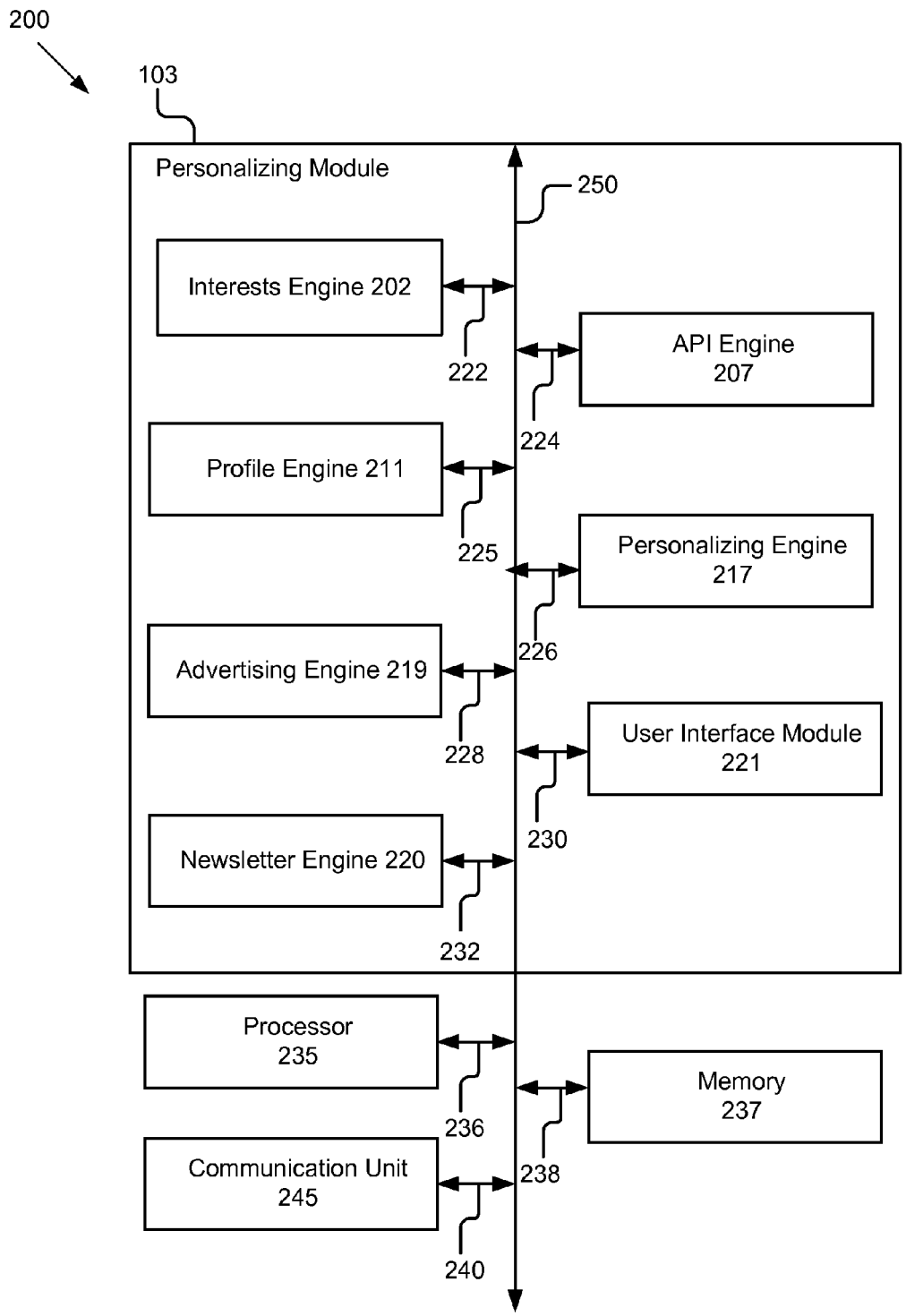
FIG. 2 is a block diagram illustrating one embodiment of a personalizing module.

Referring now to FIG. 2, the personalizing module 103 is shown in more detail. FIG. 2 is a block diagram of a computing device 200 that includes the personalizing module 103, a processor 235, memory 237 and a communication unit 245 that are each coupled to the bus 250. In one embodiment, the computing device 200 is a website server. In another embodiment, the computing device 200 is a third-party server 107. In yet another embodiment, the computing device 200 is a user device 115a.

The processor 235 comprises an arithmetic logic unit, a microprocessor, a general purpose controller or some other processor array to perform computations, provide electronic display signals to a display device. The processor 235 is coupled to the bus 250 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays and physical configurations are possible. The processor 235 is attached to the bus 250 via signal line 236.

The memory 237 stores instructions and/or data that may be executed by processor 235. The memory 237 is coupled to the bus 250 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory is attached to the bus 250 via signal line 238.

The communication unit 245 transmits and receives data (for example, user information, posts, etc.) to and from other devices and servers. The communication unit 245 is coupled to the bus 220 via signal line 240. In one embodiment, the communication unit 245 includes a port for direct physical connection to the user device 115, the external social network servers 107 or to another communication channel. For example, the communication unit 245 includes a USB, SD, CAT-5 or similar port for wired communication with the user device 115. In another embodiment, the communication unit 245 includes a wireless transceiver for exchanging data with the a communication channel using one or more wireless communication methods, such as IEEE 802.11, IEEE 802.16, BLUETOOTH® or another suitable wireless communication method.

In yet another embodiment, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 245 includes a wired port and a wireless transceiver. The communication unit 245 also provides other conventional connections to the network for distribution of files and/or media objects using standard network protocols such as TCP/IP, HTTP, HTTPS and SMTP as will be understood to those skilled in the art.

In one embodiment, the personalizing module 103 comprises an interests engine 202, an API engine 207, a profile engine 211, a personalizing engine 217, a user interface module 221, an advertising engine 219 and a newsletter engine 220.

The interests engine 202 is software including routines for generating questions and polls. In one embodiment, the interests engine 202 is a set of instructions executable by the processor 235 to provide the functionality described below for generating questions and polls. In another embodiment, the interests engine 202 is stored in the memory 237 and is accessible and executable by the processor 235. In either embodiment, the interests engine 202 is adapted for cooperation and communication with the processor 235 and other components of the computing device via signal line 222.

The API engine 207 is software including routines for retrieving more detailed questions from similar websites. In one embodiment, the API engine 207 is a set of instructions executable by the processor 235 to provide the functionality below. In another embodiment, the API engine 207 is stored in the memory 237 of the computing device 200 and is accessible and executable by the processor 235. In either embodiment, the API engine 207 is adapted for cooperation and communication with the processor 235 and other components of the computing device 200 via signal line 224.

The profile engine 211 is software including routines for receiving the answers from the user via the communication unit 245 or retrieving the answers from the memory 237 and generating a member profile for the user. In one embodiment, the profile engine 211 is a set of instructions executable by the processor 235 to provide the functionality described below for generating a member profile. In another embodiment, the profile engine 211 is stored in the memory 237 of the computing device 200 and is accessible and executable by the processor 235. In either embodiment, the profile engine 211 is adapted for cooperation and communication with the processor 235 and other components of the computing device 200 via signal line 225.

The profile engine 211 generates a membership profile that includes the user's answers to questions and polls. In one embodiment, the membership profile also includes keywords and a list of the user's friends or other relationships that are stored in memory 237 as part of a social graph. The phrase social graph as used herein encompasses its plain and ordinary meaning including, but not limited to, a graph that includes the relationships of all users that have a membership profile. The profile engine 211 generates a relationship between two users when a first user requests that the profile engine 211 establish a relationship with a second user, the profile engine 211 generates a request for confirmation that is transmitted to the second user via the communication unit 245 and the profile engine 211 receives confirmation from the second user.

The personalizing engine 217 is software including routines for retrieving the membership profile and generating particular content, such as a gadget with personalized content based on the membership profile. In one embodiment, the personalizing engine 217 is a set of instructions executable by the processor 235 to generate particular content, such as a gadget with personalized content. In another embodiment, the personalizing engine 217 is stored in the memory 237 of the computing device 200 and is accessible and executable by the processor 235. In either embodiment, the personalizing engine 217 is adapted for cooperation and communication with the processor 235 and other components of the computing device 200 via signal line 226.

The personalizing engine 217 generates code for a self-contained application (gadget) that, when embedded in a website, receives input and displays output that includes personalized content. In one embodiment, the gadgets include a social component. For example, a members gadget displays a name and icon for all members of a personalized website. Clicking on a member icon causes the members gadget to display a membership profile for the selected member. Another example is a forum gadget, which displays topics that are discussed by members of the website.

In one embodiment, the personalizing engine 217 generates a gadget that includes particular content for users that all provided the same answer to a question and references to the users that provided the same answer. The reference includes, for example, the user's name, a link to the user's membership profile, an icon associated with the user, etc.

The advertising engine 219 is software including routines for retrieving the membership profile from memory 237 and generating personalized advertisements based on the membership profile. In one embodiment, the advertising engine 219 is a set of instructions executable by the processor 235 to generate personalized advertisements. In another embodiment, the advertising engine 219 is stored in the memory 237 of the computing device 200 and is accessible and executable by the processor 235. In either embodiment, the advertising engine 219 is adapted for cooperation and communication with the processor 235 and other components of the computing device 200 via signal line 228.

The newsletter engine 220 is software including routines for retrieving the membership profiles from memory 237 or receiving the membership profiles directly from the profile engine 211 and generating newsletter information based on the membership profiles. In one embodiment, the newsletter engine 220 is a set of instructions executable by the processor 235 to generate newsletter information. In another embodiment, the newsletter engine 220 is stored in the memory 237 of the computing device 200 and is accessible and executable by the processor 235. In either embodiment, the newsletter engine 220 is adapted for cooperation and communication with the processor 235 and other components of the computing device 200 via signal line 232.

The newsletter engine 220 generates a list of the number of users that provided a response with a particular answer (e.g. in response to the question "What is the next guitar of your dreams?" 50 people answered Guitar A, 107 people answered Guitar B and four people answered Guitar C). In one embodiment, the newsletter engine 220 also generates a newsletter in response to receiving user input from the online services provider and distributes the newsletter via the communication unit 245 to the selected recipients. One advantage of having the newsletter engine 220 generate and distribute the newsletter is that the online services provider does not receive access to the emails associated with users. As a result, users are more willing to sign up with the personalizing module 103 because their privacy is not compromised by potentially untrustworthy online service providers. In one embodiment, the list of the number of users that provided a response with a particular answer includes users that opted into receiving newsletters and does not include users that requested that they not receive a newsletter.

The user interface module 221 is software including routines for generating a user interface that includes general information, such as settings, moderator information and the personalizing module 103 features. In one embodiment, the user interface module 221 is a set of instructions executable by the processor 235 to generate the user interface. In another embodiment, the user interface module 221 is stored in the memory 237 of the computing device 200 and is accessible and executable by the processor 235. In either embodiment, the user interface module 221 is adapted for cooperation and communication with the processor 235 and other components of the computing device 200 via signal line 230.

Generating Questions and Polls

Figure 3:
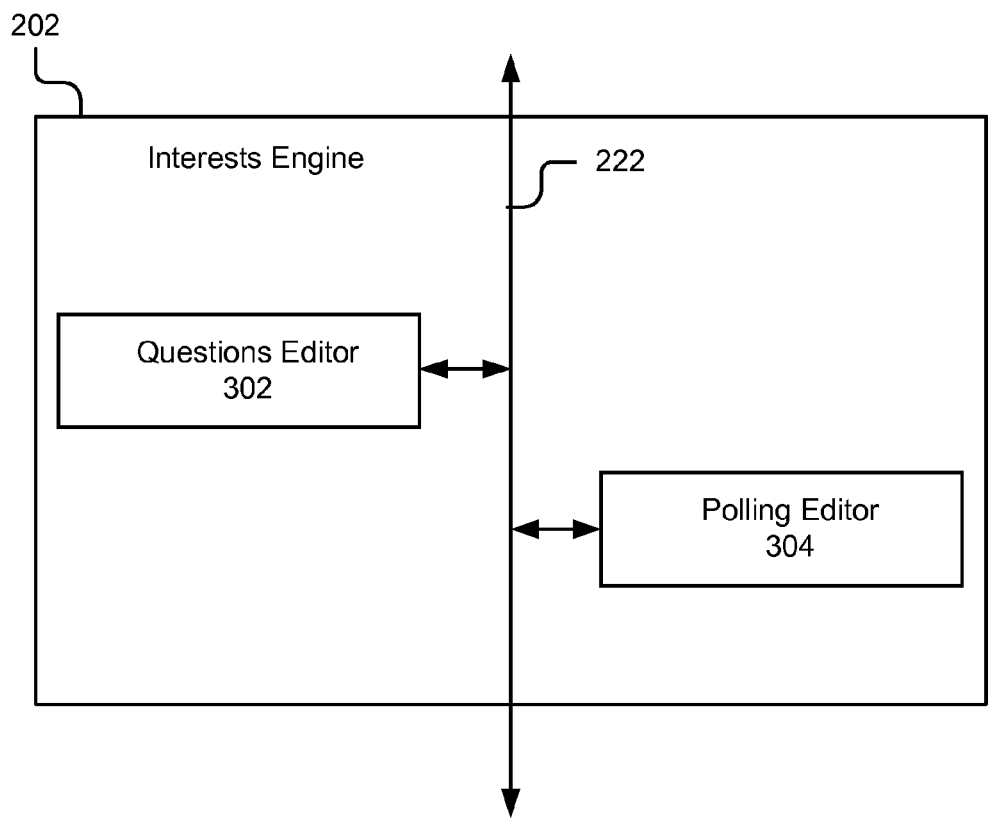
FIG. 3 is a block diagram illustrating one embodiment of an interests engine.

Turning now to the steps for generating questions and polls, the interests engine 202 generates a wizard that an online services provider uses to create questions and polls. FIG. 3 is a more detailed embodiment of the interests engine 202. In this embodiment, the interests engine 202 includes a questions editor 302 and a polling editor 304. These components are coupled for communication with each other by the bus 222. The questions editor 302 generates questions to ask the user responsive to the online services provider's input. The polling editor 304, responsive to the online services provider's selection, converts questions into a poll that is asked of all members. The results of the poll are displayed on the website for all members to view.

Questions are formatted as a single form or multiple forms. The individual questions are presented in a variety of formats including long text boxes for free form text, short text boxes for free form text, check boxes for multiple choice and radio buttons for multiple choice. In one embodiment, the multiple choice answers are displayed by the wizard as images that the user selects. The names for the images are then used to generate the membership profile. In one embodiment, the text surrounding the questionnaire includes an explanation that the responses will be available as part of the user's profile so that the user has the opportunity to not respond to certain questions that are made public. Users can opt-in or opt-out of having any information used to generate a member profile, having user preferences tracked (e.g. answers to new questions) and receiving newsletters.

Once a question has been created by the interests engine 202, the online services provider decides whether to display the question in a questionnaire or as part of a poll. Polls are used to generate community answers. When the online services provider selects the poll format, the polling editor 304 displays a user interface for specifying details about the presentation of the poll, such as size of the box, color, font, etc. Once the details are settled, the user selects a generate code button and the polling editor displays code that can be embedded into the webpage.

In response to users voting on a poll, the polling editor 304 the user interface module 221 to display a notice to inform the user that the answer is being added to the user's member profile unless the user prefers to rescind the response or respond anonymously. If the user has not provided the answer to the poll in the past, that poll is recycled again for display to the user. The user can also access the list of answered polls and register a new response to any of the already answered polls. Thus, the member profiles are dynamically updated in response to users answering more questions and polls, old and new.

Referring back to FIG. 2, the API engine 207 allows online services providers to contract deeper integrations into their website design than are possible with the interests engine 202. In one embodiment, the API engine 207 is used to retrieve via the communication unit 245 detailed information for generating questions and polls. Specifically, the API engine 207 retrieves a list of questions and the structured answers and aggregates data about how community members have answered the questions and specific data about how the viewer has responded to the questions.

In another embodiment, the API engine 207 gathers additional information that is not in a poll or question format, such as a list of favorite articles. The API engine 207 generates a favorite button that is overlaid on webpages and articles. When a user selects the favorite button, the webpage and article names are automatically added to the member's profile. In one embodiment, restrictions are placed on the list of favorites so that it is not cumbersome. The restrictions include only displaying a set number of most recent articles. The other articles can be displayed upon request.

Figure 4A:
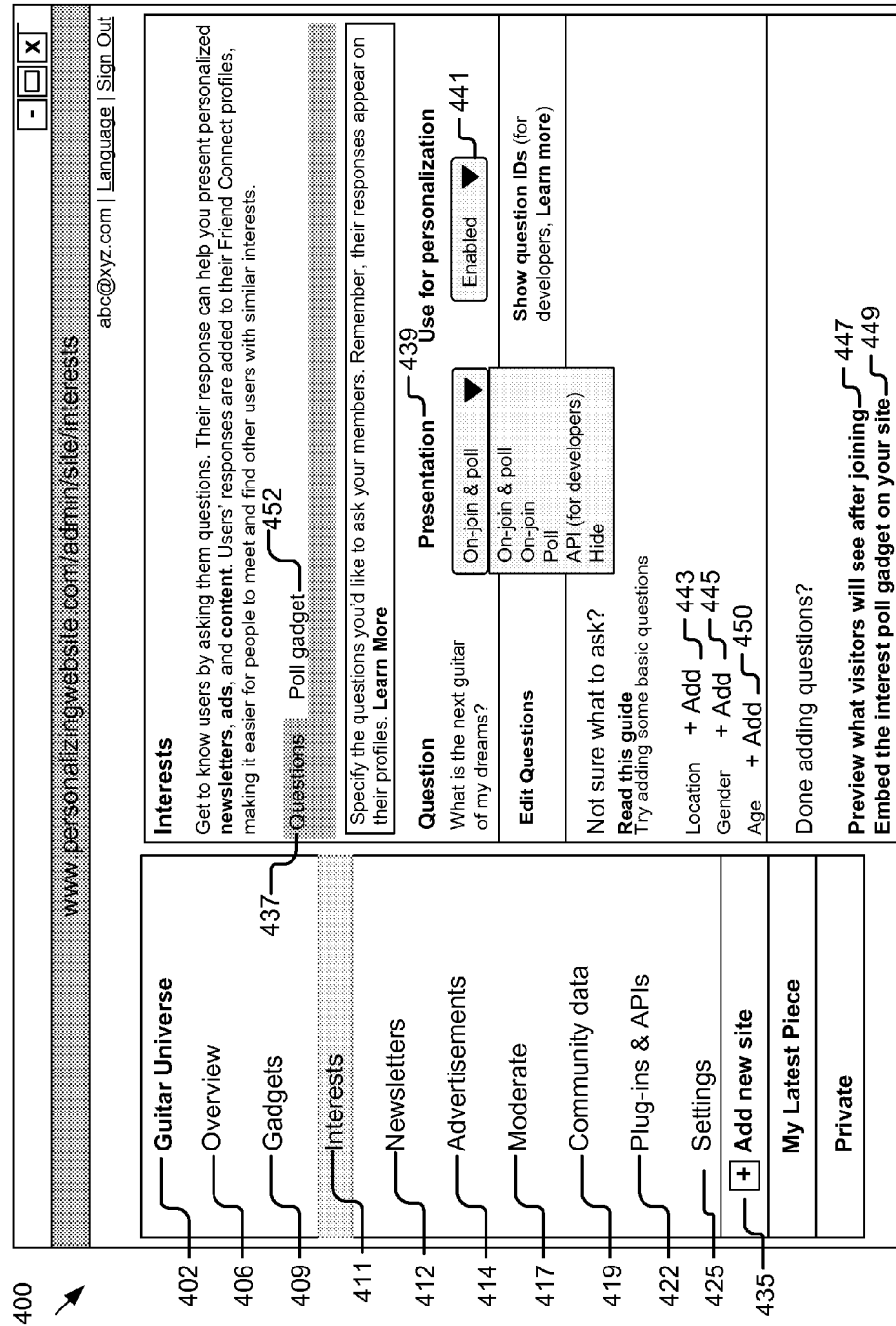
FIG. 4A is a graphic representation of one embodiment of a user interface generated by a questions editor.

FIG. 4A is a graphic representation of a user interface 400 generated by the interface module 221 in response to receiving instructions from the interests engine 202. In this embodiment, the personalizing module 103 includes a user interface 400 that lists the different functions as applied to the website that is being designed by the online services provider. In this example, the website is called Guitar Universe 402. The functions are organized as an overview link 406, a gadgets link 409, an interests link 411, a newsletters link 412, an advertisements link 414, a moderate link 417, a community data link 419, a plug-ins & APIs link 422 and a settings link 425. To add a new website, the user selects the add new site icon 435.

Selecting the overview 406 link causes the user interface to display a summary of the different actions that can be performed on Friend Connect. For example, the user can add a gadget, find more gadgets, activate the interests engine 202, send a newsletter, modify the advertisements, review community data, etc.

Selecting the gadgets link 409 causes the user interface to display options for generating a social gadget. The gadgets will be discussed in more detail below with reference to the member profiles. Selecting the interests link 411 causes the user interface to display a wizard for generating questions and polls. Selecting the advertisements link 414 causes the user interface to display options for configuring advertisements that are configured to reflect user interests. Selecting the moderate link 417 causes the user interface to display options for managing the members, such as blocking problematic members. Selecting the community data link 419 causes the user interface to display various statistics about members, such as when they first joined the website. Selecting the plug-ins & APIs link 422 causes the user interface to display options for generating third-party plug-ins and APIs. Lastly, selecting the settings link 425 causes the user interface 400 to display various settings for topics not included in the other links.

FIG. 4A illustrates the user interface 400 for the Guitar Universe website. The user interface 400 is used for all websites controlled by a particular online services provider. To generate questions or a poll, the user selects the interests link 411. The user interface module 221 generates a window with a questions tab 437 and a poll gadget tab 452. In this example, the questions tab 437 was selected. The questions screen displays the question, presentation and use for personalization. The user inputs a specific question or borrows one from another website. In one embodiment (not shown), the screen also lists any questions or polls selected before. This type of information is retrieved from the API engine 207.

The presentation option 439 includes a drop-down box for specifying when to present the question. Specifically, the questionnaire will be presented after a new member joins, in a poll, both after a new member joins and in a poll, as an API or the questions are hidden. Lastly, the questions can be used for personalization by selecting the enabled icon 441.

In one embodiment, the questions editor 302 generates basic questions that a user automatically adds to a questionnaire. In this example, the user interface 400 adds location, gender and age in response to selecting the location icon 443, the gender icon 445 and the age icon 450 respectively. Once the questionnaire is complete, the user can preview 447 the questionnaire and select the embed icon 449 to switch to the poll gadget 452 screen, which contains code for embedding in a website.

Figure 4B:
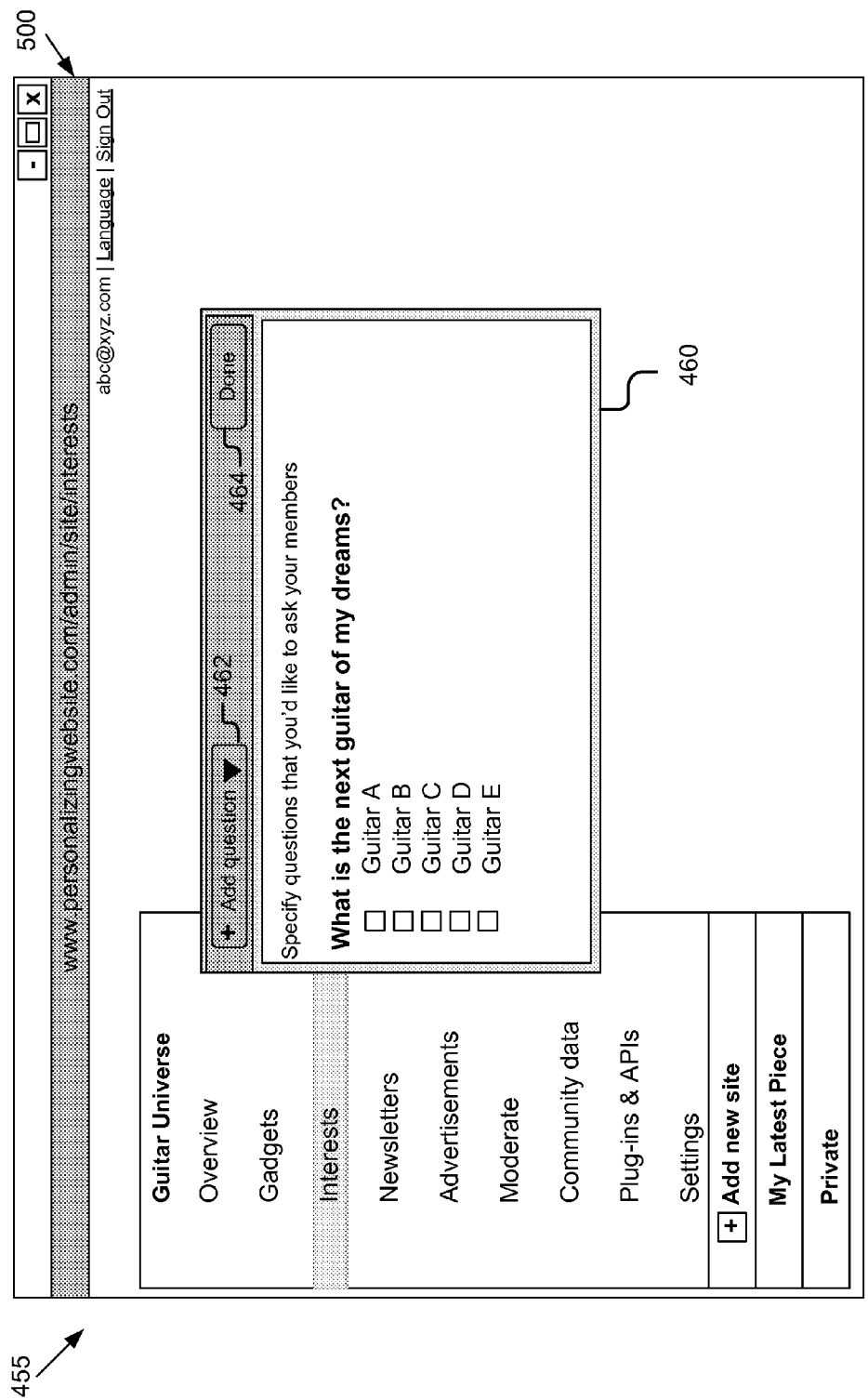
FIG. 4B is a graphic representation of one embodiment of a user interface for creating questions.

FIG. 4B is a graphic representation of a user interface 455 for controlling how questions are edited. In this example, the popup box 460 includes a multiple choice question about the member's dream guitar. The online services provider adds another question by selecting the add question icon 462. When the online services provider is done creating the questionnaire, the process is completed by selecting the done icon 464. In one embodiment, the user interface 455 includes the option (not shown) of sharing original questions with a community to be reused in other websites. As will be discussed below this is an opportunity for monetization because the answers are tied to advertisement revenue.

The interests engine 202 assigns all questions a unique identifier and saves them in memory 237. The memory 237 is also used as storage for member profiles, answers to questions and polls, etc. For performance reasons an aggregate is written as the total number of responses to a question and also aggregate counts for each answer. This allows both raw and proportional views of the poll data to be generated quickly. It also allows responses to be rescinded later simply by decrementing the aggregate count when the response is deleted.

In one embodiment, the information is also denormalized into separate stores that are used to generate views of site profiles and member profiles. The site description normally contains a list of question IDs. In one embodiment, the data storage also contains cached copies of the question text and individual responses. This allows for fast generation of user profiles by avoiding the need to reference several different data stores when generating a profile view. Similarly, a user profile normally contains the identification of all website identifications that are used to look up responses by the user. Thus, to improve read operations of user profiles, copies of the responses with all their text representations are also stored in memory 237.

Generating a Newsletter

Figure 5:
FIG. 5 is a graphic representation of one embodiment of a user interface for creating newsletters.

Once the questions and polls are completed, the newsletter engine 220 retrieves membership profiles generates a newsletter for the online services provider. FIG. 5 is a graphic representation of a user interface 500 for creating newsletters. The newsletters user interface 500 is divided into three categories: composing the newsletter, the history of all newsletters and settings related to the newsletter. The process for sending a newsletter is divided into three steps: (1) composing a newsletter; (2) choosing recipients; and (3) previewing and sending the newsletter.

FIG. 5 illustrate the settings for the compose newsletter tab 502. To compose a newsletter, the online services provider provides a title or subject line. Depending upon the topic of the newsletter, this includes a serialization, such as "Guitar Universe Issue 3, Volume 1.1" or something more specific to a particular topic, such as "Thoughts on the upcoming Rock Band concert."

The text of the newsletter is included in the newsletter box 507. The format includes plain text, links, appending of images (not shown), etc. To include recent members and activities in the newsletter, the online services provider selects the checkbox 510 beneath the newsletter box 507. In one embodiment, the newsletter engine 220 displays a list of the last five (or 10, 15, etc.) members to join. The recent members are displayed as a list that includes, for example, the member names, an icon associated with each member, a link to the members' profiles, and a time of how long ago the members joined. The recent activity includes, for example, activities within the gadgets and other parts of the website. This can be a short description, such as "Four new comments were left in the guestbook" or something more detailed, such as "Sarah801 started a topic titled 'Who wants to carpool to the Rock Band concert?'"

In one embodiment, the newsletter engine 220 suggests items for the newsletter based on website activity. For example, the online services provider specifies that he wants to see all forum discussions involving the search terms "Rock Band." The newsletter engine 220 retrieves the discussions from memory 237 and generates links that the online services provider includes in the email. In another embodiment, the newsletter engine 220 suggests discussions that have the most number of comments or are the most viewed discussions. In yet another embodiment, the newsletter engine 220 suggests discussions based on the users' membership profiles or activities on the social network gadgets.

Turning now to the second step of choosing recipients, the newsletter engine 220 allows the online services provider to categorize recipients according to how they answered questions and polls. FIG. 5 illustrates one example where the online services provider chooses between sending the newsletter to all subscribers or only subscribers who match a certain criteria. For example, the newsletter is only being sent to members that indicated that the next guitar of their dreams is a Guitar A or a Guitar B.

The newsletter engine 220 retrieves from memory 237 a list of the number of members that provided a particular answer. For example, if the online services provider sends the newsletter to the 50 people that marked Guitar A as the next guitar of their dreams, 107 people that marked Guitar B as the next guitar of their dreams and four people that marked Guitar C as the next guitar of their dreams, the newsletter engine 220 displays the total recipients 513 as 161. In one embodiment, the newsletter engine 220 retrieves the number of members from memory 237 each time the online services provider reloads the page or clicks on the checkbox to select the subscribers associated with a particular answer. That way the list is up-to-date.

In another embodiment, the newsletter engine 220 retrieves a list of interests from memory 237 and displays a number of people that are associated with each interest. The interest can be something that was explicitly stated by the member or it can be inferred from social activities. For example, the newsletter engine 220 searches for discussions or comments where the member is making a positive or negative statement. An example of a positive statement is: "I have a Guitar D." An example of a negative statement is "I don't like Rock Band." From these statements, the newsletter engine 220 determines that the member should receive newsletters about Guitar D and not about Rock Band. In one embodiment, the profile engine 211 modifies the member's profile to add Guitar D as an interest and Rock Band as something that the member dislikes.

The user interface module 221 maintains privacy of the members by not revealing the email addresses of the members. By displaying the number of members associated with a particular response but not the identifying information for those members, the newsletter engine 220 strikes a balance between maintaining privacy and giving the online services provider sufficient information to make important choices. The online services provider could discern the identity of members based on their answer, but the membership profile does not display the member's email address. In another embodiment, the member may select to display an e-mail address through an opt-in policy.

Once the recipients are selected, the newsletter engine 220 allows the online services provider to preview the newsletter and send it to the recipients. In one embodiment, the newsletter engine 220 transmits the newsletter to a third-party server 107 or an online services server 101 via the communication unit 245 where the email addresses of the members is available. In one embodiment, the newsletter engine 220 restricts the publication of newsletters to a certain number of newsletters per week and recommends that the online services provider only send out newsletters once every other week so that subscribers are not overwhelmed by the newsletters and, as a result, lose interest in the website.

Establishing a Member Profile

Figure 6:
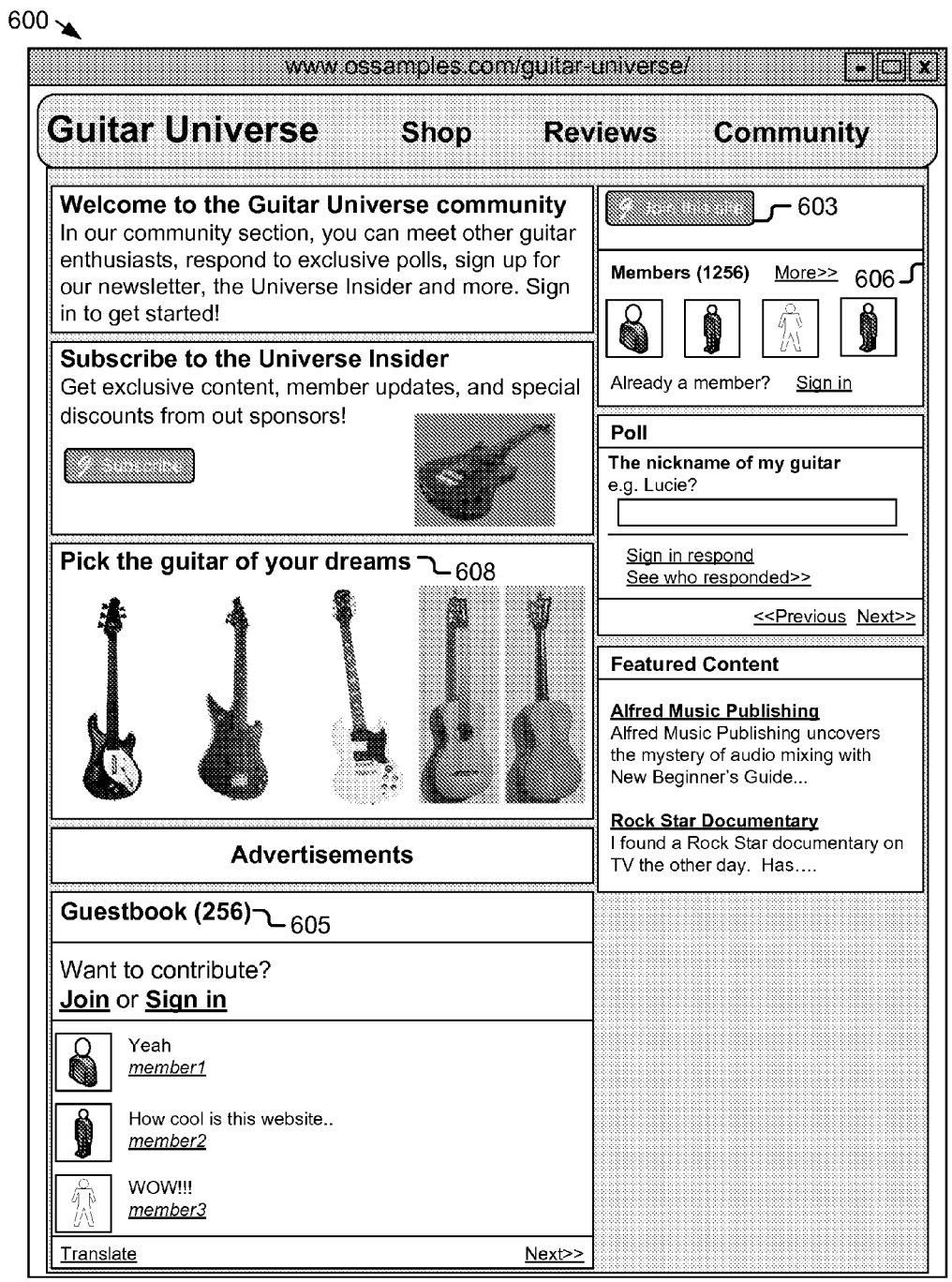
FIG. 6 is a graphic representation of one embodiment of an anonymous view of the website.

Once the online services provider has finished configuring the website and embedding the appropriate gadgets, the website is ready to receive members. FIG. 6 is a graphic representation 600 of an anonymous view of the website. When the user is anonymous, the website displays introductory information and requests for user information. The questions and polls are arbitrary. The featured content and advertisements are generic. For example, the personalizing engine 217 generates a members gadget 606 that displays the complete list of members of the website.

The website already displays a poll 608 for picking the guitar of your dreams. In this case, the multiple choice options are visual representations of guitars. The poll 608 is displayed even though the identity of the user has not been established because the poll 608 includes the option for anonymous input. In one embodiment, the poll prevents people from voting multiple times by restricting the votes according to a client's IP address.

A user becomes a member of the website by joining or signing in using an email address or other identifying information. To join, the user selects the join icon 603 on the upper right-hand side of the user interface or the user signs into one of the other gadgets, such as the guestbook gadget 605. Joining prompts the profile engine 211 to display a popup (not shown) with different ways for joining In one embodiment, the user joins using Google Friend Connect.

Joining as a new member causes the profile engine 211 to extract the user's generic profile (if available). A generic profile includes, for example, information about a person's location, education, interests, superpowers, etc.

Once the user joins, the profile engine 211 displays the polls and questions that the online services provider selected for display responsive to users joining the website. These questions are used to personalize the website. Once the user completes the questions and polls, the profile engine 211 assigns unique identifiers to the answers that are stored in memory 237, generates a member profile for the user that contains the user's answers and updates any polls with the user's answers. In one embodiment, when information received through the site specific website conflicts with the generic profile, the profile engine 211 asks the user to resolve the conflict, for example, by confirming that the recently input data is correct. If the user provides information through the website that is not contained in the user profile, the profile engine 211 asks the user whether she would like the information to be added to the generic profile.

Figure 7:
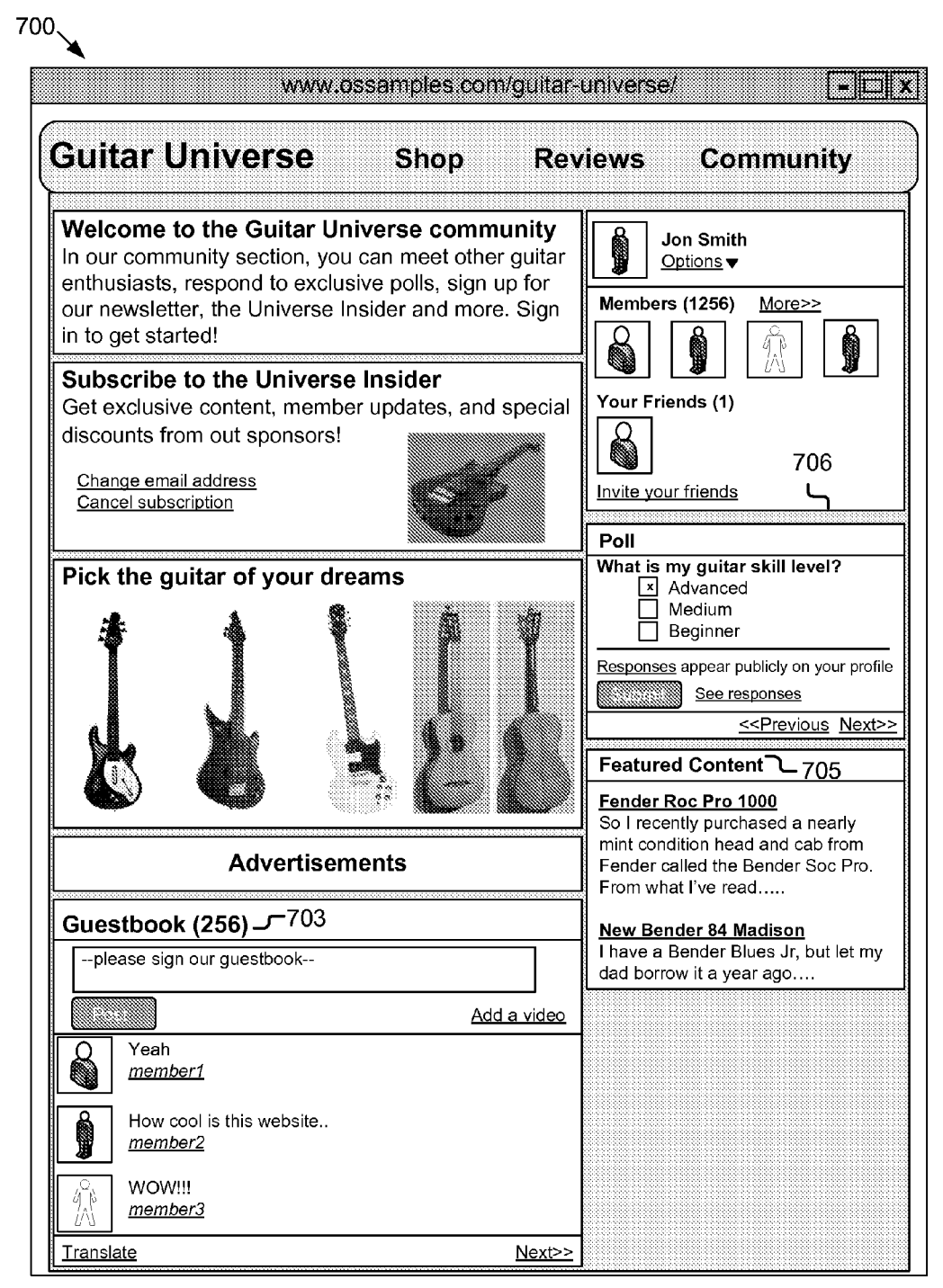

FIG. 7 is a graphic representation 700 of a member's view of the website. In this example, Jon Smith joined the website and is now able to participate in the social networking gadgets. For example, the guestbook gadget 703 allows logged-in users to leave comments, add video, pictures, etc. The gadgets are tailored to reflect information associated with the member. For example, Jon Smith indicates that he is interested in Fender products. As a result, when Jon loads the website, the featured content gadget 705 filters the results for items that contain "Fender" in the subject header. The advertisements are similarly filtered to increase the likelihood that the user will click on a relevant advertisement.

A member makes friends on the website using the members gadget 706. Now that Jon Smith has logged in, the members gadget 706 shows that there are still 1256 members and that one of those members is his friend. This gadget allows members to more easily track information associated with friends by clicking on their names to view their profiles. When a member makes a friendship on one Friend Connect website, the friendship is maintained on all websites with the Friend Connect gadgets. By restricting website information through content, the users discover like-minded strangers that share their interests.

Figure 8:
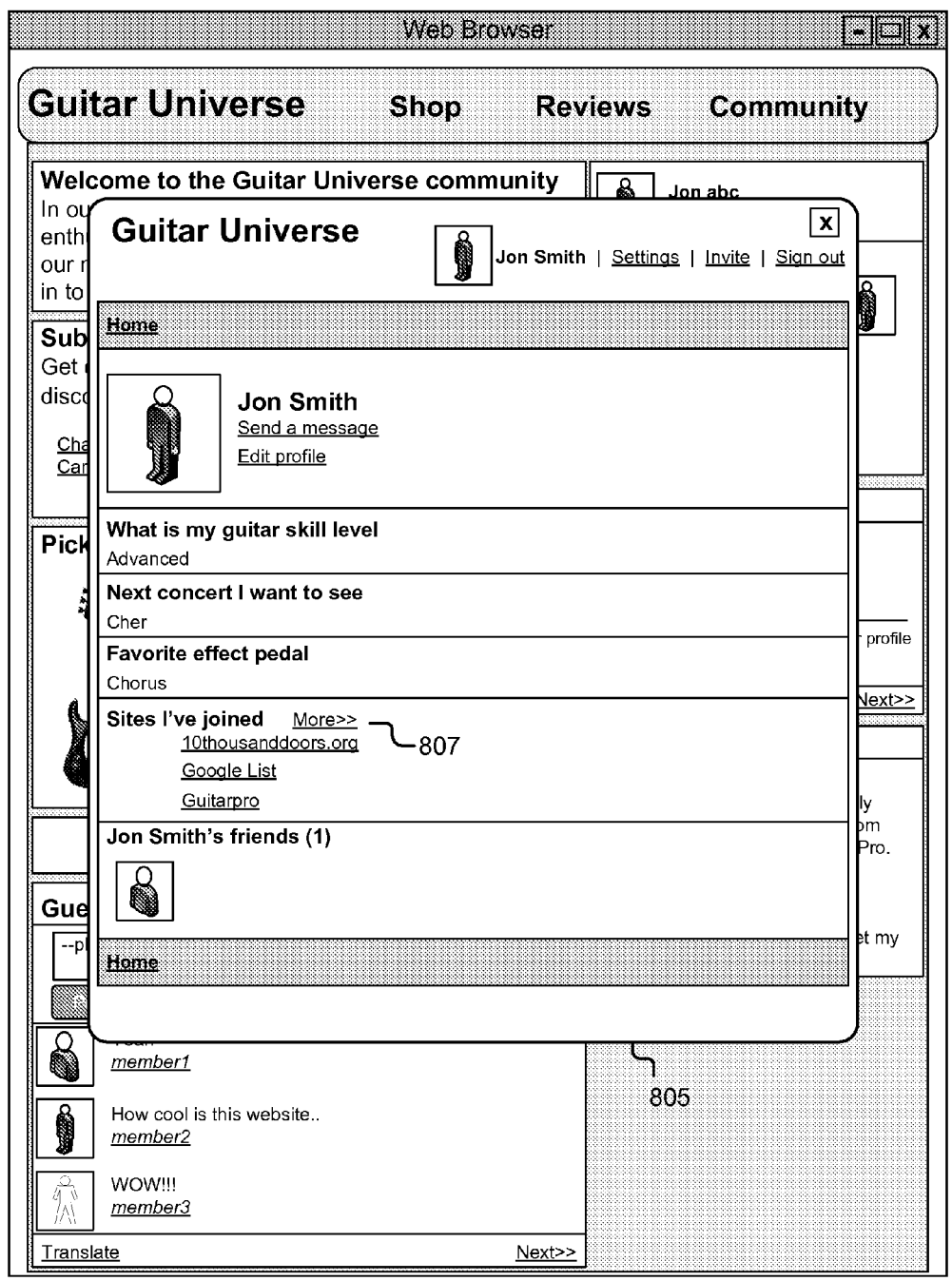
FIG. 8 is a graphic representation of one embodiment of a member profile.

FIG. 8 is a graphic representation of a member profile. The profile 805 is specific to the Guitar Universe website. The information was gathered from Jon Smith's answers to questions and polls, such as having an advanced guitar skill level, wanting to see a Cher concert and asserting that the chorus is Jon's favorite effect pedal.

The profile engine 211 also displays a list 807 of other websites that Jon Smith joined. If a friend were to click on Jon Smith's profile on another website, the displayed profile information would pertain to the subject matter of that website. The list 807 of other websites promotes website federation, which is the term for establishing a group of websites based on shared commonalities.

Example

Formation of Questions and Polls

In one embodiment, the API engine 207 retrieves from the memory 237 previously used questions and polls from other websites and the interests engine 202 suggests that the online services provider incorporate the questions and polls into his website. The suggestions take a variety of forms including: (1) the spellcheck method; (2) the synonym method, where the interests engine 202 determines the subject matter of a question and suggests other topics within the same category; and (3) the interests engine 202 determines the subject matter of the website and provides previously used questions from websites with similar subject matter.

The spellcheck method includes the following example. The online services provider inputs the question: "What is your favorite Brrand A guitar?" The interests engine 202 responds with the message, "Did you mean to state, 'What is your favorite Brand A guitar?'" The user corrects the question with the properly spelled guitar brand.

The synonym method includes the following example. The user creates the following question for a poll: "What is the next concert that you are attending?" The options are: "Band A, Band B and Band C." The interests engine 202 submits Band A, Band B and Band C to a classification engine, which classifies these bands as ones where guitar is heavily featured in the music. The classification engine returns the names of other bands that also heavily feature guitar, such as Band D. The names of the other bands are then incorporated as multiple choice answers.

Figure 9A:
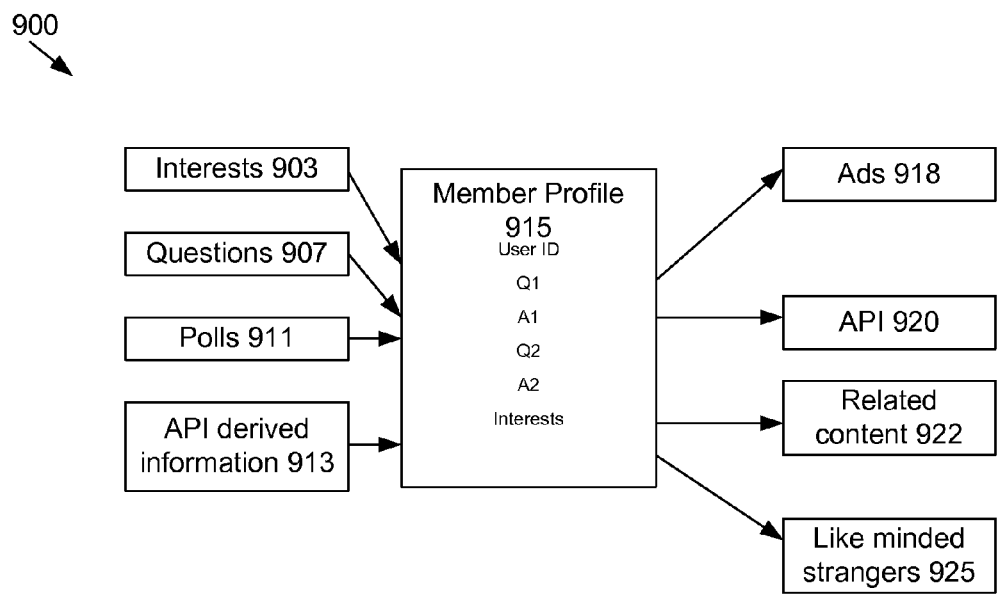
FIG. 9A is a block diagram of one embodiment of a system for using information to generate a member profile, which is in turn used to generate personalized information.
Figure 9B:
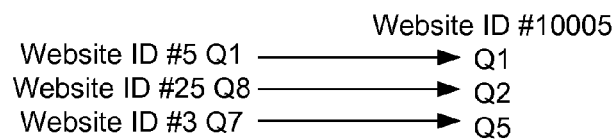
FIG. 9B is a block diagram of the process for using questions from other websites to aid in personalizing another website.

The website comparison method is illustrated in FIGS. 9A and 9B. FIG. 9A is a block diagram 900 of one embodiment for using information to generate a member profile, which is in turn used to generate personalized information. The information comes from a variety of sources including, but not limited to, interests 903 (that are explicitly listed or inferred from user activity), questions 907, polls 911 and API derived information 913. The member profile 915 is generated by the profile engine 211. The member profile 915 includes a unique user identification and a list of the questions and answers for questions, polls, a list of interests, etc. The profile information is then transmitted to various engines, such as the personalizing engine 217 and the advertising engine 219 to generate personalized advertisements 918, APIs 920 and related content 922.

The personalizing engine 217 retrieves membership information from memory 237 or from a remote storage location and generates various social network gadgets that incorporate the membership information, such as a list of all the members of a particular website. In one embodiment, the personalizing engine 217 generates a gadget that displays a website ring, i.e. a list of websites that share common features. The gadget can also share content between the different websites.

The advertising engine 219 retrieves the membership profile from memory 237 and generates personalized advertisements 918 by displaying advertisements that match the user's responses. In addition, the advertising engine 219 works in conjunction with the gadgets to display the same topics at the same time. For example, if the featured content gadget displays articles on banjos, the advertising engine 219 displays advertisements for purchasing banjos because banjos are fresh in the user's mind and reading about them can inspire the user to make a purchase. In one embodiment, the advertising engine 219 displays advertisements for purchasing banjos based on the user's age retrieved from the membership profile, with younger users in their teens being shown cheaper banjos and older users being shown expensive banjos to purchase. Alternatively, the user is allowed to configure the advertisements shown to reflect his or her interests.

In one embodiment, the profile engine 211 transmits the member profile information to a matching engine that finds similar like minded strangers 925. The profile engine 211 transmits a suggestion to the member that the like minded strangers 925 have similar profiles. The profile engine 211 also suggests strangers who have responded to questions and polls in a similar or compatible manner. Alternatively, the user discovers like minded strangers 925 through participation in social networking gadgets, such as the guestbook 703.

FIG. 9B is a block diagram of the process for using questions from other websites to aid in customizing another website. The online services provider establishes the subject matter of the website, for example, guitars. The API engine 207 retrieves questions asked on other guitar websites and the interests engine 202 displays them as suggested questions or polls to the online services provider. If there are many suggested questions or polls that are appropriate, in one embodiment the questions or polls are ordered based on their relevance to the website, such as their performance on other websites measured by their impact on engagement with users and on their monetization capability through tied advertisements. Each question and answer has its own unique identification and is tracked. The online services provider selects the interesting questions or polls and completes the selection process. The interests engine 202 stores the website ID and question number for each selected question. This information is used later for monetization purposes. For example, if the online services provider makes any profit on advertisements that are related to the questions, such as identifying someone as a Gibson fan, a portion of the profits can go to the original author of the question.

Methods

Figure 10:
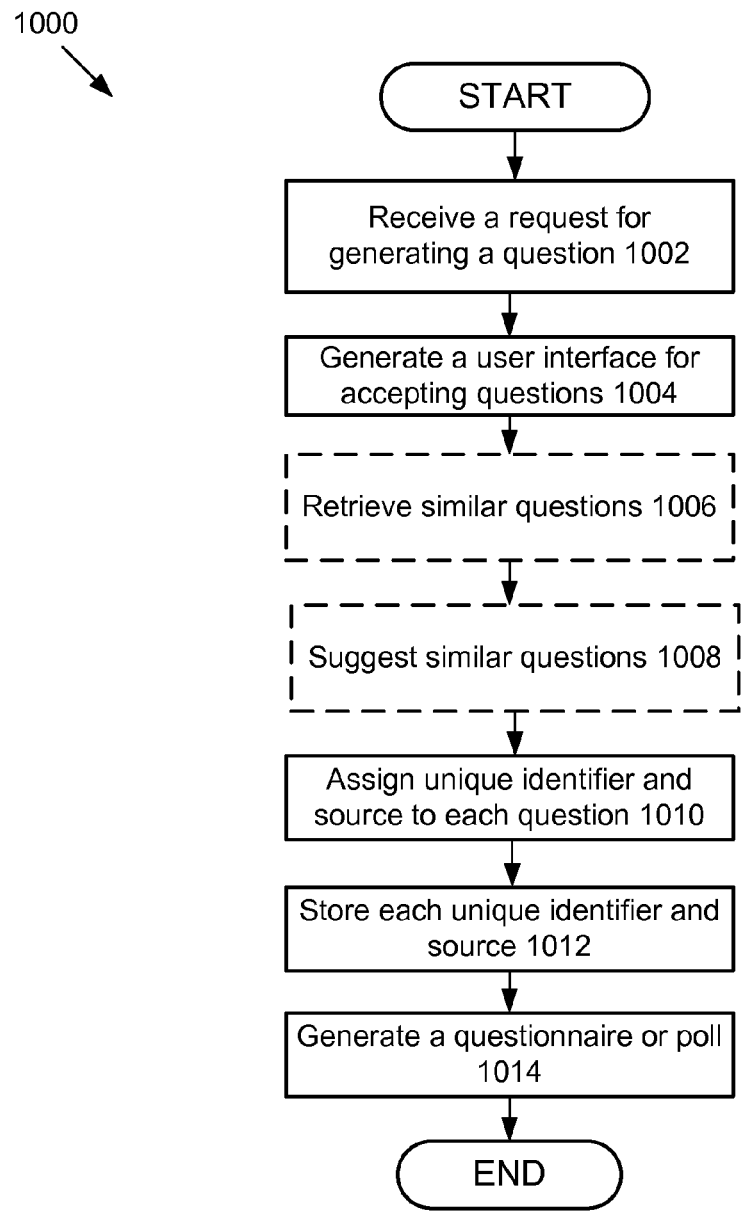
FIG. 10 is a flow diagram of one embodiment of a method for generating questions and polls.
Figure 11:
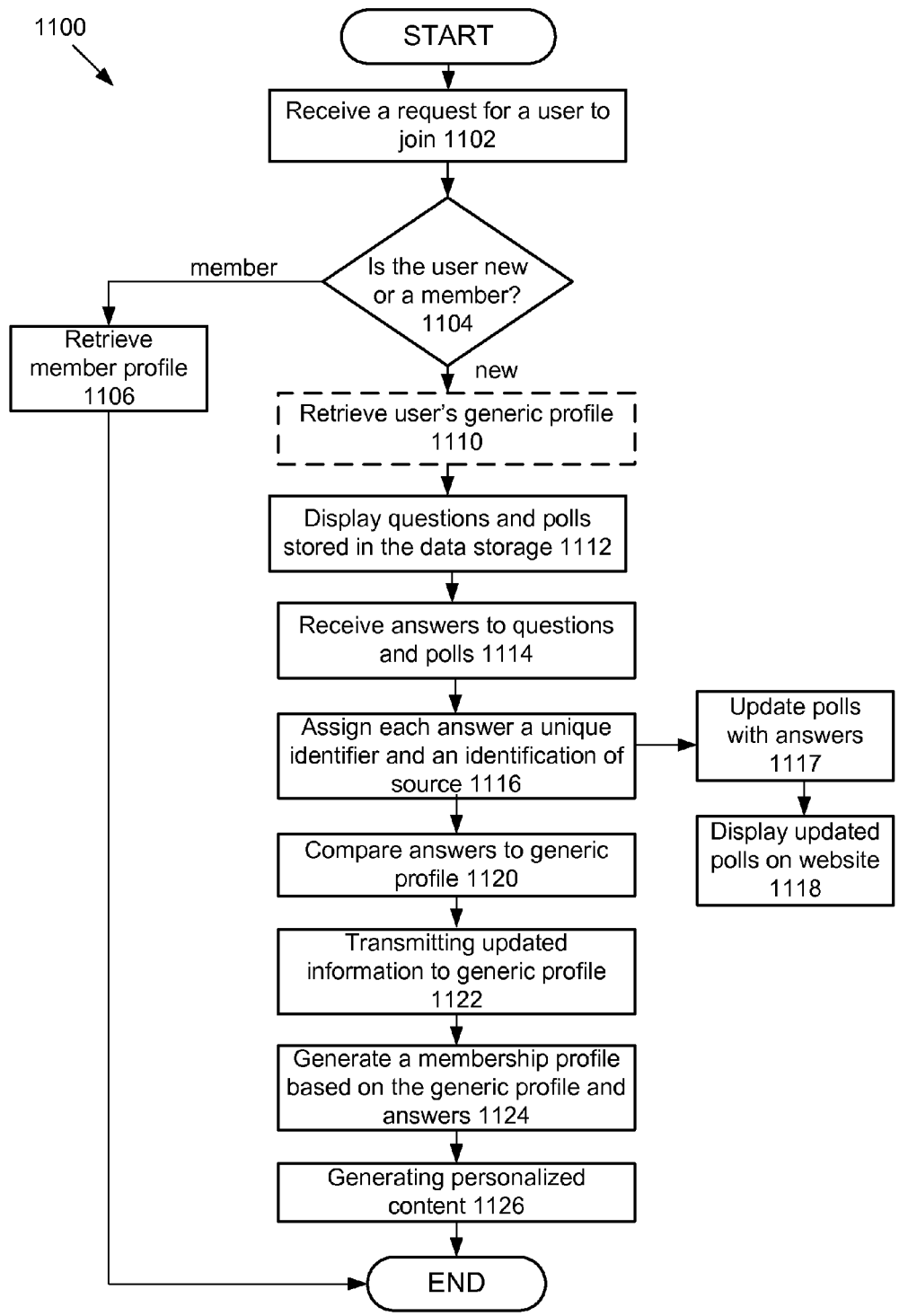
FIG. 11 is a flow diagram of one embodiment of a method for generating a membership profile.
Figure 12:
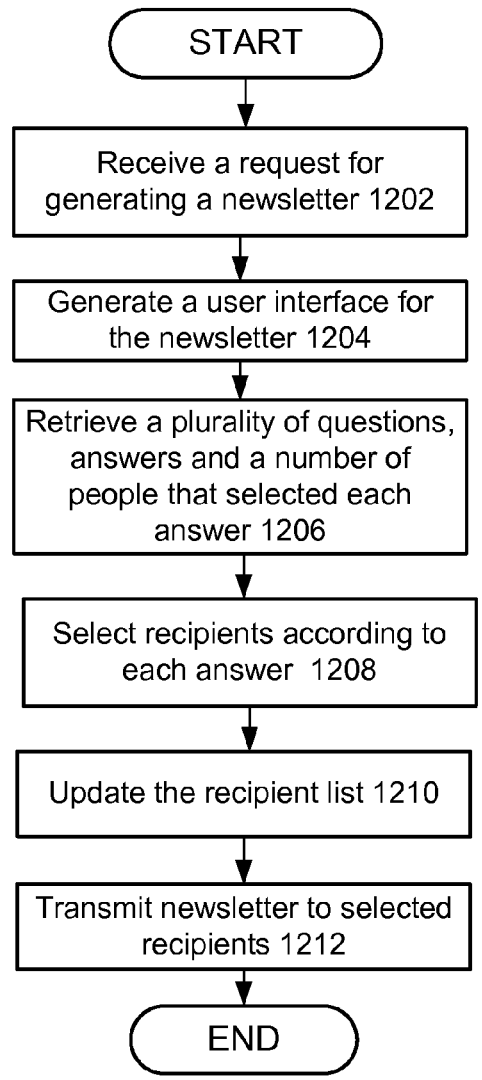
FIG. 12 is a flow diagram of one embodiment of a method for generating a newsletter.

Referring now to FIGS. 10-12, various embodiments of the methods will be described. FIG. 10 is a flow diagram 1000 of one embodiment of a method for generating questions and polls. The interests engine 202 receives 1002 a request from an online services provider to generate a question. The interests engine 202 instructs the user interface module 221 to generate 1004 a user interface for accepting question text and the format of the question. As described above, the question takes many forms including free form text fields, multiple choice with checkboxes, radio boxes or pull-down lists, etc.

In one embodiment, the API engine 207 retrieves 1006 similar questions from the memory 237 and the interests engine suggests 1008 similar questions to the online services provider. The suggestions are either based on similarity of words, similarity of categories or similarity of websites. For the display format, the question or poll is displayed in any of the following ways: responsive to the user joining the website or after the user joins, a box is displayed as part of the website. Once the questions are created (either all at once or after completing all questions), the interests engine 202 assigns 1010 a unique identifier and a source to each question and stores 1012 the question, unique identifier and indicator of source in the memory 237. Responsive to the online services provider's request, the interests engine 202 generates 1014 a questionnaire or poll.

FIG. 11 is a flow diagram 1100 of one embodiment of a method for generating a membership profile. An anonymous user loads the webpage. The profile engine 211 receives 1102 a request for the user to join. The profile engine 211 receives information from the user and determines 1104 whether the user has an existing member profile or is a new user. For example, the profile engine 211 displays a window that prompts the user to join if the user is a new member or sign in if the user has a membership profile. Thus, if the user selects the join icon, the user is a new member. If the user selects the sign in icon, the user is already a member. Responsive to selecting the sign in icon, the profile engine 211 prompts the user for user identification. In one embodiment, the profile engine 211 accepts a variety of identifications including, for example, an email address and password for the email provider, an open ID or a username and password for a social website.

If the user is an existing member, the profile engine 211 retrieves 1106 the membership profile from memory 237 and proceeds to step 1126. If the user is new, in one embodiment the profile engine 211 retrieves 1110 a generic profile for the user. The generic profile includes information about the user's interests, location, websites, superpowers, etc. If the user remains anonymous or there is no generic profile available, the profile engine 211 generates a generic profile.

The profile engine 211 displays 1112 questions and polls stored in memory 237. The profile engine 211 receives 1114 answers to questions and polls and assigns 1116 each answer a unique identifier and an identification of source and stores them in memory 237. The personalizing engine 217 updates 1117 the polls with the new user's answers and displays 1118 the updated polls on the website.

The profile engine 211 compares 1120 the answers to the generic profile. If there is a conflict between the answers and the generic profile, the profile engine 211 transmits 1122 updated information to the server that manages the generic profile. In one embodiment, the online services server 101 manages the generic profile. In one embodiment, the profile engine 211 also asks the user for confirmation about any conflicts.

The profile engine 211 generates 1124 a membership profile based on the generic profile and the answers. Information from the generic profile is only used if it pertains to the topic of the website. Thus, in one embodiment, the profile engine 211 identifies the subject matter of the website and selects information from the generic profile that matches that subject matter. The more general information, such as where the user has lived, is not used unless that is somehow relevant to the website (such as a travel website) because the purpose of the membership profile is to show a focused subset of information. The profile engine 211 instructs the user interface module 221 to generate 1126 personalized content, such as particular content that includes personalized content for users that answered a question in the same way. The personalized content is transmitted to the user device 115 via the communication unit 245 if the personalizing module 103 is stored on the online services server 101 or the third-party server 107. If the personalizing module 103 is stored on the user device 115, the user interface module 221 transmits the data collection that includes the personalized content the display device for rendering.

FIG. 12 is a flow diagram 1200 of one embodiment of a method for generating a newsletter. The newsletter engine 220 receives 1202 a request for generating a newsletter and instructs the user interface module 221 to generate 1204 a user interface for the newsletter. The newsletter engine 220 retrieves 1206 a plurality of questions, answers and the number of people that selected each answer. The newsletter engine 220 instructs the user interface module 221 to generate a data collection that includes this information with the question as a header, the answers as a subset and the number of members that selected each answer. In one embodiment, the newsletter engine 220 retrieves multiple choice questions and answers. In another embodiment, the newsletter engine 220 retrieves other types of answers that are easy to categorize, such as one-word answers.

The newsletter engine 220 provides a mechanism for selecting the subscribers according to the answer, for example, by including a checkbox next to the answer or a drag-and-drop of the selection. The newsletter engine 220 selects 1208 recipients for the newsletter according to each answer. In one embodiment, the newsletter engine 220 updates 1210 the recipient list. The updating occurs each time a user answers a new question, responsive to the online services provider refreshing the web browser, new users are added to the system, etc. In one embodiment, the newsletter engine 220 generates the newsletter responsive to receiving information from the online service provider and transmits 1212 the newsletter to selected recipients via the communication unit. In another embodiment, the newsletter engine 220 transmits information for contacting the selected recipients (e.g. email addresses) to the online service provider.

In the above description, for purposes of explanation, numerous specific details are set forth in order to provide a thorough understanding of the specification. It will be apparent, however, to one skilled in the art that the specification can be practiced without these specific details. In other instances, structures and devices are shown in block diagram form in order to avoid obscuring the description. For example, the specification is described in one embodiment below with reference to user interfaces and particular hardware. However, the specification applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the specification. The appearances of the phrase "in one embodiment" in various places in the specification are not necessarily all referring to the same embodiment.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the specification be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for collecting data for personalizing a newsletter, executing on one or more computing devices, the method comprising:
   determining a subject matter of a first online service;
   retrieving, with the one or more computing devices, from a second online service having a similar subject matter to the subject matter, questions for a plurality of users of the first online service, each question having corresponding answers;
   determining a measure of performance of the retrieved questions based on advertisement monetization associated with the retrieved questions and an impact of the retrieved questions in engaging users on the second online service;
   determining, from the retrieved questions, a question based on the measure of performance;
   receiving, from a user of the first online service, a response including a selection of a first selected answer from the answers to the determined question;
   responsive to receiving the first selected answer, dynamically updating a membership profile of the user on the first online service to include the first selected answer, the membership profile representing the user to the plurality of users and being specific to the subject matter of the first online service;
   generating a data collection that includes the retrieved questions, the answers and a number of users that selected each answer;
   transmitting the data collection to an online services provider of the first online service; and
   receiving a selection of recipients to receive the newsletter based at least in part on the answers included in the data collection.

2. The method of claim 1, further comprising:
   generating the newsletter; and
   transmitting the newsletter to the selection of recipients.

3. The method of claim 1, further comprising transmitting information for contacting the selection of recipients to the online services provider.

4. The method of claim 2, wherein the newsletter includes a list of recent activity.

5. The method of claim 2, wherein the newsletter includes a list of users for whom a membership profile was recently generated.

6. The method of claim 5, wherein the list of users includes at least one of a user name, an icon associated with each user, a link to the user's member profile and a time of how long ago the membership profile was generated.

7. The method of claim 1, further comprising updating a recipient list responsive to at least one of receiving a new user answer and a request to refresh a browser that displays the questions, answers and the number of users that selected each answer.

8. The method of claim 1, further comprising the steps of:
   determining the number of users that are associated with interests based on discussions and comments associated with the first online service; and
   transmitting the number of users associated with the interests to the online services provider.

9. The method of claim 1, further comprising a step of suggesting items for the newsletter based on user activity associated with the first online service.

10. The method of claim 8, wherein suggesting items for the newsletter comprises generating links of forum discussions that are associated with the first online service.

11. The method of claim 8, wherein suggesting items for the newsletter comprises generating links for at least one of a most viewed or a most commented on discussion.

12. A computer program product comprising a non-transitory computer usable medium including a computer readable program, wherein the computer readable program when executed on a computer causes the computer to:
   determine a subject matter of a first online service;
   retrieve, from a second online service having a similar subject matter to the subject matter, questions for a plurality of users of the first online service, each question having corresponding answers;
   determine a measure of performance of the retrieved questions based on advertisement monetization associated with the retrieved questions and an impact of the retrieved questions in engaging users on the second online service;
   determine, from the retrieved questions, a question based on the measure of performance;
   receive from a user of the first online service, a response including a selection of a first selected answer from the answers to the determined question;
   responsive to receiving the first selected answer, dynamically update a membership profile of the user on the first online service to include the first selected answer, the membership profile representing the user to the plurality of users and being specific to the subject matter of the first online service;
   generate a data collection that includes the retrieved questions, the answers and a number of users that selected each answer;
   transmit the data collection to an online services provider of the first online service; and
   receive a selection of recipients to receive a newsletter based at least in part on the answers included in the data collection.

13. The computer-program product of claim 12, further comprising:
   generating the newsletter; and
   transmitting the newsletter to the selection of recipients.

14. The computer-program product of claim 12, further comprising transmitting information for contacting the selection of recipients to the online service provider.

15. A system comprising:
   one or more processors; and
   a memory storing instructions that, when executed, cause the system to:
     determine a subject matter of a first online service;

retrieve, from a second online service having a similar subject matter to the subject matter, questions for a plurality of users of the first online service, each question having corresponding answers;

determine a measure of performance of the retrieved questions based on advertisement monetization associated with the retrieved questions and an impact of the retrieved questions in engaging users on the second online service;

determine, from the retrieved questions, a question based on the measure of performance;

receive from a user of the first online service, a response including a selection of a first selected answer from the answers to the determined question;

responsive to receiving the first selected answer, dynamically update a membership profile of the user on the first online service to include the first selected answer, the membership profile representing the user to the plurality of users and being specific to the subject matter of the first online service;

generate a data collection that includes the retrieved questions, the answers and a number of users that selected each answer;

transmit the data collection to an online services provider of the first online service; and receive a selection of recipients to receive the newsletter based at least in part on the answers included in the data collection.

16. The system of claim 15, wherein the memory further stores instructions that, when executed, cause the system to:

generate the newsletter; and transmit the newsletter to the selection of recipients.

17. The system of claim 15, wherein the memory further stores instructions that, when executed, cause the system to:

transmit information for contacting the selection of recipients to the online services provider.

\* \* \* \* \*

UNITED STATES PATENT AND TRADEMARK OFFICE
CERTIFICATE OF CORRECTION

PATENT NO. : 9,449,302 B1  
APPLICATION NO. : 13/289992  
DATED : September 20, 2016  
INVENTOR(S) : Joshua Marantz et al.

Page 1 of 1

It is certified that error appears in the above-identified patent and that said Letters Patent is hereby corrected as shown below:

In the Specification:

In column 4, line 20, please replace "incorporates" with --incorporated--

In column 16, line 19, between "profile" and "If," please insert --.--.

Signed and Sealed this  
Fifteenth Day of November, 2016

Michelle K. Lee  
*Director of the United States Patent and Trademark Office*